Patented July 22, 1952

2,604,460

UNITED STATES PATENT OFFICE 2,604,460

COMPOSITIONS COMPRISING A POLYVINYL CHLORIDE RESIN STABILIZED WITH ORGANO-TIN COMPLEX COMPOUNDS

Gerry P. Mack, Jackson Heights, N. Y., assignor to Advance Solvents & Chemical Corporation, New York, N. Y.

No Drawing. Application August 19, 1949, Serial No. 111,338

6 Claims. (Cl. 260—45.75)

1

The invention relates to stabilized polyvinyl chloride and compositions containing the same.

It is well known that vinyl chloride resins and resins formed by conjoint polymerization of vinyl chloride with vinyl acetate or other polymerizable compounds are liable to discoloration when subjected to elevated temperatures during or after compounding and also under the influence of prolonged exposure to light. It is further known that certain organo-tin compounds are capable of preventing or retarding such discoloration.

Heretobefore, it has been considered axiomatic in the preparation of organo-tin compounds for use as stabilizers that the presence of substantial amounts of organo-tin halides therein has to be avoided because such tin halides antagonize the stabilizer effect and decompose the vinyl resins in which the stabilizers are to be incorporated. This requirement of preparing halide-free stabilizers has considerably increased the cost of preparation of the tin stabilizers because most of them are prepared from the organo-tin halides as the most readily available starting materials; the preparation has to be carefully supervised to avoid the presence of said starting materials in the end products or special steps have to be taken to remove unreacted halides from the end products.

Unexpectedly, I have found that satisfactory organo-tin stabilizers associated with tin halides may be obtained when the tin halides are not present as free halides but form complexes with the organo-tin moiety of the composition. Such complex compounds are known and described in the literature, particularly in the work by Harada, Science papers of the Institute of Physical and Chemical Research (Tokyo), vol. 35 and 36; they are readily obtained, for instance, by reacting organo-tin halides with organo-tin oxides or hydroxides whereby said oxides and hydroxides need not be pure but may contain halides.

Characteristic features of these complex compounds are that they do not slit off halogen in solution and that they are soluble in alcohols, aromatic hydrocarbons, and other conventional organic solvents, in contradistinction to the free organo-tin oxides or hydroxides which are insoluble in said solvents. In alcoholic solution the hydroxy groups are converted to alkoxide groups and the resulting tin alkoxide—tin halide complexes can be obtained in crystallized form.

The organo-tin halide compositions useful as stabilizers are compounds of which one moiety is the organo-tin halide and the other moiety an alkyl tin compound containing at least one tin

2 atom of which two valences are taken up by oxygen.

I believe that these complexes are oxonium compounds comparable to the compounds which are formed by inorganic tin halides with oxygen-containing organic compounds, such as alcohols, ethers, and the like.

Particularly suitable as stabilizers are those complex compounds in which one organo-tin halide molecule is linked to a polymerized group consisting of three or more, i. g. up to 10, organo-tin hydroxides or alkoxides, i. e. with an anhydropolystannanediol or a polymeric dialkyl dialkoxide. These compounds may be represented by the molecular formula

$$RO(Sn(R'_2)O)_n R \cdot SnR'_2 X_2$$

where R is hydrogen or an alkyl radical, R' is an alkyl radical from 1 to 12 carbon atoms, $n$ is a numeral from 3 to 10 and X stands for chlorine, bromine or iodine.

The method of preparation of these compounds consists, for instance, in refluxing a dialkyl tin oxide with a dialkyl tin halide in a suitable solvent, such as benzene, toluene, xylene, in the presence of a trace of moisture until the dialkyl tin oxide is completely dissolved. The crystalline complex compound precipitating on cooling is then separated from the liquid.

These complexes are represented by the formula given hereinbefore where R is a hydrogen atom. When these complexes are dissolved at elevated temperature in, and recrystallized from, an alcohol, said hydrogen atoms are replaced by alkyl groups. The alkyl substituted complexes may also be directly obtained by refluxing the dialkyl tin oxide or hydroxide and dialkyl tin dihalide in the corresponding absolute alcohol.

For the preparation of the complex compounds any dialkyl tin oxide or hydroxide and dihalide may be used. Examples are dimethyl, diethyl, dipropyl, dibutyl, diamyl, dihexyl, dioctyl, di 2-ethylhexyl, dilauryl tin oxide, chloride, bromide or iodide. As the alcohol component any primary aliphatic alcohol can be used, for example, methyl, propyl, butyl, amyl, 2-ethylhexyl alcohol, and the like.

The alkyl substituted complexes are easily hydrolyzed. In the presence of water or moisture they split off the alcoholic groups and are reconverted to the polystannanediol complexes. Unless very high boiling alcohols are used, the splitting off of the alcohol does not materially affect the stabilizing effect; the solvent action of the alcohol contributes to a uniform distribution of the stabilizer and the alcohol is to a certain extent evaporated during the milling of the resin mix without harmful effects to the workmen. The essential characteristic of all complex compounds, as defined herein, is the fact that the organo-tin halide remains firmly bound within the complex during and after the preparation of the plastic composition and does not produce the deterioration and discoloration of the vinyl resin observed when free organo-tin halides are present.

Halogen-containing resins, which are made heat and light resistant by the stabilizers of this invention, include polymers of vinyl chloride; copolymers of vinyl chloride with vinyl esters of aliphatic acids, particularly vinyl acetate; copolymers of vinyl chloride with esters of acrylic and methacrylic acids, and with acrylonitrile; copolymers of vinyl chloride with diene compounds and unsaturated dicarboxylic acids or their anhydrides, such as copolymers of vinyl chloride with chlorobutadiene, diethyl maleate, diethyl fumarate or maleic anhydride; after-chlorinated polymers and co-polymers of vinyl chloride; polymers of vinyl chloride with vinylidene chloride and other polymerizable compounds; polymers of vinyl chloroacetate and dichlorodivinyl ether; chlorinated polymers of vinyl acetate; and mixtures of the polymers recited herein with each other or other polymerizable compounds.

The amount of stabilizer used for the above listed resins will be generally so adjusted that 0.1 to 5 per cent, preferably 0.3 to 3 per cent, of tin by weight of the halogen-containing resin are employed. The organo-tin complex compound may also be used in combination with other organo-tin or tin-free stabilizers.

It will be apparent that the compounds employed as stabilizers in our invention may also be used to stabilize other halogen-containing resins and rubber-like products, for instance polymers and co-polymers of vinylidene chloride; chlorinated polymeric esters of acrylic and alpha-substituted acrylic acids; polymers of chlorinated styrenes, for instance dichlorostyrene; chlorinated rubber; chlorinated polymers of ethylene; polymers and after-chlorinated polymers of chlorobutadienes, and their copolymers with vinyl chloride; rubber hydrochloride and chlorinated rubber hydrochloride. The corresponding bromides and brominated products are equally well stabilized.

The following examples will serve to illustrate the invention:

Example 1

150 g. of dibutyl tin oxide and 60 g. of dibutyl tin dichloride were refluxed in 1500 cc. of methanol at a temperature of 66–67° C. for six hours until a clear solution was obtained. The hot solution was quickly filtered and then cooled. A complex tin compound crystalized out in the form of fine crystals. When subjected to analysis the compound was found to contain 43.35 per cent of tin and 6.33 per cent of chlorine. It corresponded essentially to the formula $$CH_3O(Sn(C_4H_9)_2O)_3CH_3Sn(C_4H_9)_2Cl_2$$

which requires 43.3 per cent of tin and 6.46 per cent of chlorine.

0.5 g. of this complex tin compound were added to 64.5 parts of a vinyl chloride-vinyl acetate copolymer resin containing about 95 per cent of vinyl chloride and 5 per cent of vinyl acetate and 35 parts of di 2-ethylhexyl phthalate, and the mix was milled on a rubber mill for 10 minutes at 310–320° F. The film obtained was then heat pressed between polished steel plates to a sheet 6" by 6" and 1/32" thick. This sheet was placed in a forced draft oven at 320–330° F. and baked for 15, 30, 45 and 60 minutes. The last sheet baked for 60 minutes showed a slight yellowish discoloration, whereas the other films were completely transparent and colorless. A sheet prepared using the same resin and plasticizer containing no stabilizer was light brown already after the pressing step and turned dark brown after 15 minutes of baking at 320° F.

Example 2

The same resin mix was used as in Example 1, but instead of the trimeric dibutyl tin dimethoxide-dibutyl tin dichloride complex, 0.5 g. of a physical mixture of a polymeric dibutyl tin dimethoxide and dibutyl tin dichloride in the ratio of 3:1 was used. This mixture had the same tin and chlorine content as the complex compound used in Example 1 but did not show any stabilizing properties. The film samples treated in the same way as outlined in Example 1 showed already after 15 minutes of baking time large areas of black discoloration.

Example 3

58 g. of diethyl tin oxide and 24.7 g. of diethyl tin dichloride were refluxed in 600 cc. of moist benzene for 3 hours until a clear solution was obtained, then the benzene solution was filtered from a small amount of impurity and the benzene distilled off under reduced pressure. Crystals were obtained which according to the analysis corresponded essentially to a complex compound of the formula $$HO(Sn(C_2H_5)_2O)_3H \cdot Sn(C_2H_5)_2Cl_2$$

This compound was insoluble in cold but soluble in hot ethyl alcohol. From the solution in hot ethyl alcohol crystals separated out on cooling, which were dried in a vacuum desiccator. They corresponded to the formula $$C_2H_5O(Sn(C_2H_5)_2O)_3C_2H_5 \cdot Sn(C_2H_5)_2Cl_2$$

Each of these two compounds was used for a stabilizing test wherein 0.64 g. were milled with 64 g. of a vinyl chloride resin and 35 g. of dioctyl phthalate continuously on a roll mill at 325° F. for 30 minutes and then again for 45 minutes. The color of the milled sheets was compared with a similar and similarly treated resin mix containing no stabilizer. The result was that both stabilized sheets were practically colorless, whereas the unstabilized sheet was reddish brown after 15 minutes of milling time.

Example 4

24.9 g. of dibutyl tin oxide and 6 g. of dibutyl tin dichloride were refluxed in 150 cc. of toluol until a clear solution was obtained; then the toluol was distilled off under reduced pressure and the crystalline solid residue was dried in a vacuum desiccator. Then 10 grams of this residue was dissolved in boiling n. butyl alcohol from which, after evaporating the largest part of the solvent, a crystalline product was obtained which had a tin content of 43 per cent and contained 4.35 per cent of chlorine. It corresponded essentially to the compound:

$$C_4H_9O(Sn(C_4H_9)_2O)_5C_4H_9 \cdot Sn(C_4H_9)_2Cl_2$$

which contains theoretically 42.85 per cent of tin and 4.27 per cent of chlorine. 0.5 g. of this compound were added to a mix containing 64.3 g. of a vinyl chloride-diethyl maleate copolymer resin and 35 g. of dinonyl phthalate plasticizer and the mix was milled on a rubber mill as described in Example 1. The baked sheets showed no discoloration after 30 and 45 minutes in the oven at 320–330° F.

Example 5

0.5 g. of a mixture containing dibutyl tin oxide and dibutyl tin dichloride in a ratio of 3:1 were added to a resin mix consisting of 65 g. of a vinyl chloride-vinyl acetate copolymer containing about 95% of vinyl chloride and about 5 per cent of vinyl acetate and 35 g. of dioctyl phthalate. The mix was treated and sheets were prepared as described in Example 1. No stabilizing effect was observed; on the contrary, the sheets showed a much more pronounced discoloration than sheets prepared from a resin mix containing no stabilizer.

The foregoing examples show that dialkyl tin dihalides in a mechanical mixture with dialkyl tin stabilizers destroy the stabilizing effect of such stabilizers, whereas organo-tin complex compounds containing an organo-tin halide chemically bound to another organo-tin compound of the structure defined hereinbefore are good stabilizers for halogen-containing resins when processed under the conditions set forth in the examples.

In the examples, I have shown alkyl tin complexes as stabilizers because the alkyl tin halides and oxides are more readily available in commerce than the corresponding aryl compounds. However, I have found that complex compounds, in which one or both moieties are an aryl tin compound, have the same stabilizing effect and can be used in the same way as alkyl tin halide complex compounds. Such aryl compounds are, for instance, diphenyl, dibenzyl, ditolyl, dixylyl, and similar dichlorides which may be combined with the corresponding diaryl tin oxide or with dialkyl tin oxides, or the diaryl tin oxides may be combined with dialkyl tin halides in the manner set forth hereinbefore.

The halogen containing organo-tin halide compounds are not first rate stabilizers, as their stabilizing action is in some respects inferior to that of certain halogen-free organo-tin compounds. For instance, they should not be used when the processing of the resin must be carried out for a prolonged time at temperatures between 315–350° F. and when maximum clarity and light resistance of the resin is required.

However, I have found that they are satisfactory, for instance, for pigmented resins and in cases where the resin is processed at temperatures of 300–315° F. and where a slight discoloration of the resin is not harmful. For such cases, the invention makes available a group of stabilizers which impart to the resin a good heat stability and which can be easily and economically prepared from readily available starting materials without necessitating complicated and time consuming purifying steps.

Heretofore, the compounds referred to herein have been named differently by different investigators. For instance, the compounds of the general formula $(HO)(SnR_2O)_nH$ have been designated as anhydropolystannanediols.

I prefer a nomenclature conforming to the accepted nomenclature of the corresponding silicium compounds, and I use the term "stannoxane" for $SnH_2O$ units in analogy to the term "siloxane" for $SiH_2O$ units. Accordingly, the correct designation of compounds represented by the above formula would be hydrocarbon-substituted polystannoxane-alpha, omega-diols, which term is used in the claims.

As to the compounds $(RO)(SnR_2O)_nR$ wherein R is alkyl, they may be either designated as polymeric dialkyl dialkoxides or as diethers of alkyl-substituted polystannoxane-alpha, omega-diols.

It will be understood that in the structural formulae applicant is merely giving what he believes to be the structures of the recited products. It is intended that the specification and claims shall protect the products as obtained according to the invention, even though the precise structures of the stabilizers may later be shown to be other than those indicated in the specification.

Other uses and modifications of the invention will be apparent to those skilled in the art and are included within the scope of the invention as defined by the appended claims.

What I claim is:

1. A composition as claimed in claim 4 wherein the resin is a conjoint polymer of vinyl chloride and diethyl maleate.

2. A thermally stable resinous composition containing a conjoint poymer of vinyl chloride with vinyl acetate intimately combined with a plasticizer and with a polymeric dibutyl tin dimethoxide-dibutyl tin dichloride complex compound of the formula $$H_3CO \cdot (Sn(C_4H_9)_2O)_n CH_3 \cdot (C_4H_9)_2 SnCl_2$$

wherein $n$ is a numeral from 3 to 10.

3. A composition as claimed in claim 4 wherein the tin content is 0.1 to 5 per cent by weight of the vinyl chloride plastic composition.

4. A heat and light resistant plastic composition including as a major constituent a halogen-containing resin and as a stabilizer an organo-tin complex compound of the formula $$(RO)(SnR''_2O)_n R' \cdot SnR''_2 X_2$$

wherein R and R' are each a member of the group consisting of hydrogen and alkyl, R'' is a member of the group consisting of alkyl and aryl, X is a member of the group consisting of chlorine and bromine, and $n$ is a numeral from 3 to 10.

5. A heat and light resistant composition including as a major constituent a halogen-containing resin and as a stabilizer an organo-tin complex compound of the formula $$R'O(SnR_2O)_n R' \cdot SnR_2 Cl_2$$

wherein R is alkyl, R' is an alkyl radical having not more than 12C atoms, and $n$ is a numeral from 3 to 10.

6. A heat and light resistant composition as defined in claim 4 wherein the resin contains a plurality of vinyl chloride units.

GERRY P. MACK.

REFERENCES CITED

The following references are of record in the file of this patent:

UNITED STATES PATENTS

| Number | Name | Date |
|---|---|---|
| 2,267,777 | Yngve | Dec. 30, 1941 |

OTHER REFERENCES

Harada, Papers of The Institute of Physical and Chemical Research, Tokyo, 1939, vol. 35 (pages 318–325).